INVENTORS
PAUL E. BUCHER
THOMAS PICUNKO

United States Patent Office 3,669,551
Patented June 13, 1972

3,669,551
ANALOG DATA REDUCTION CIRCUIT FOR A ROTATING SPECTROPHOTOMETER WHEREIN THE LIGHT PASSING THROUGH A SELECTED CHAMBER IS COMPARED WITH ALL OTHERS
Paul E. Bucher and Thomas Picunko, Bronxville, N.Y., assignors to Union Carbide Corporation, New York, N.Y.
Filed Apr. 15, 1971, Ser. No. 134,338
Int. Cl. G01n 21/24
U.S. Cl. 356—197
1 Claim

ABSTRACT OF THE DISCLOSURE

Known rotating spectrophotometers have a series of cuvettes arranged concentrically around a horizontally rotatable disc so that when the disc is rotated, centrifugal force mixes and transfers reagents and samples to the cuvettes. As each cuvette passes a light source, the absorbence of each individual sample is detected and measured photometrically, and is converted to an electrical signal pulse.

Figure 1:
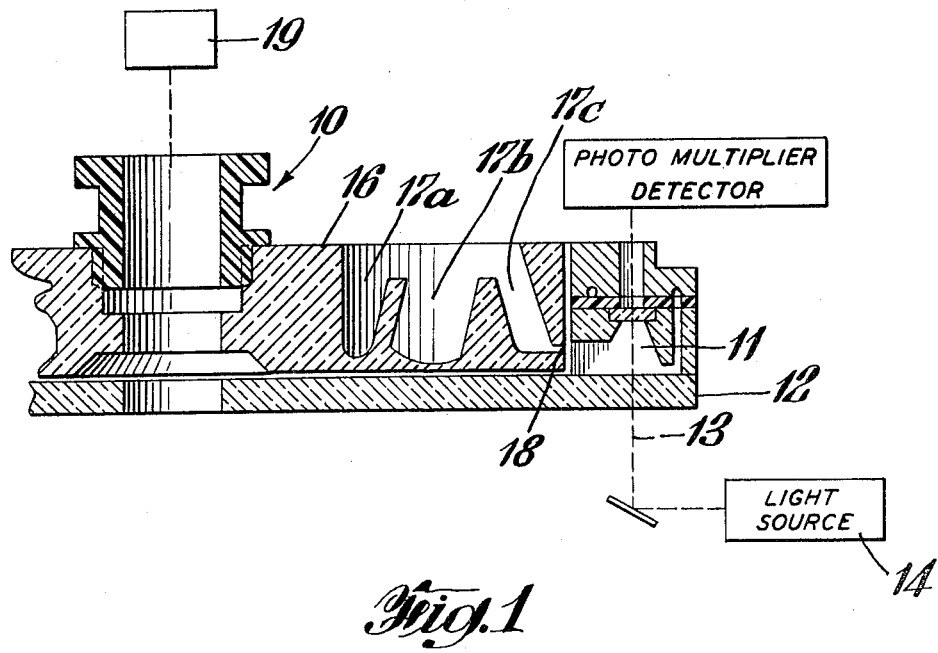

The device of this invention takes the first electrical signal pulse and translates it to a second electrical pulse proportional to the logarithm of the first electrical signal pulse. The difference between a reference pulse and each second electrical signal pulse is taken and, transformed into output pulses.

The invention relates to an improved analog data reduction circuit for a rotating spectrophotometer, and to a method for continuously analyzing the presence of a substance in a plurality of samples that are rotating in a centrifugal field.

In recent years, the need for rapid, automatic analytical devices has increased markedly, owing to the numerous microanalytical studies in biochemical research, routine clinical testing for physicians and hospitals, enzymatic studies, and the like. In addition to the increased demand for analysis, in certain fields it is often critical that a series of reactions be started at exactly the same time if reliable results are to be obtained. This is particularly important for enzymatic studies wherein detectable changes often take place after the reaction has proceeded for only a few seconds or minutes. However, few devices are available which can analyze sufficiently rapidly and accurately to handle the increasing number and varied tests desired by clinicians and research workers.

Recently, multistation analytical photometers which utilize a centrifugal field have become available for the rapid microanalysis of a wide variety of liquids such as blood serum and other body fluids, food products, and the like. Since numerous analysis can be performed rapidly and simultaneously, these devices are of particular interest wherein a large number of samples is involved or a variety of tests on one sample is desired. Moreover, since these devices allow the use of relatively small volumes of reagents, the use of expensive reagents can be minimized.

One such device which utilizes a centrifugal field in microanalytical studies is described in "Analytical Biochemistry," 28, 545–562 (1969). This device employs the principle of doublebeam spectrophotometry wherein absorbencies of a reference solution are inter-compared. The system is basically a series of cuvettes arranged around the periphery of a rotor so that when it is spun, centrifugal force simultaneously mixes and transfers reagents and samples to the cuvettes where an analysis is made spectrophotometrically. A sample loading disc is provided which contains rows of cavities arranged concentrically. Reagents are placed in the inner cavities, and the samples to be analyzed are placed in cavities at a greater radial distance than those containing the reagents. The sample loading disc is then indexed and positioned in the rotor with each individual reagent and sample system having a corresponding cuvet. As the rotor is accelerated, centrifugal force moves the reagent to the cavity containing the sample, where they are mixed and the mixture of reagent and sample is then moved through a communicating passage into the cuvette. The filled cuvettes rapidly spin past the fixed light beam, and the transmission of light through the cuvettes, i.e. through the samples, is measured.

In one mode of operation of this rotating photometric analyzer, one cuvette is employed as a reference cuvette and it is filled with a reference liquid such as distilled water. The remaining cuvettes will contain the samples to be analyzed by comparing the liquid in the reference cuvette with each of the sample liquids in the remaining cuvettes individually. The present invention relates to an electrical circuit and a method to facilitate this purpose.

Accordingly, it is a main object of this invention to provide an electrical circuit and method for comparing each of a plurality of samples in a rotary photometric analyzer with a reference. Another object of the invention is to provide a useful electrical output signal that is proportional to the difference between a reference sample and each other sample in turn in a multistation photometric analyzer.

Other objects of the invention will be apparent from the following description and appended drawings and claims.

In the drawings:

FIG. 1 schematically illustrates a rotor assembly and photometric system of a rotary photometric analyzer which can be used with the invention.

Figure 2:
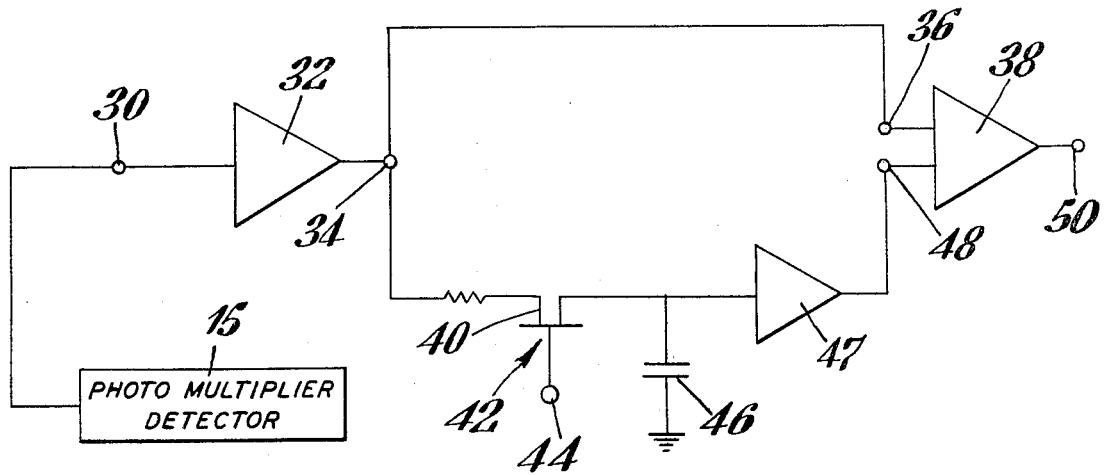

FIG. 2 is an electrical diagram embodying the principles of the invention.

Referring now to FIG. 1, a rotor assembly 10 for use with the invention is shown. The rotor assembly 10 includes a plurality of sample analysis chambers 11, or cuvettes, that are positioned at a common radial position in the rotor assembly 10. Each of the cuvettes 11 has a light transmitting means to allow the passage of light through the chamber. Thus, in the rotor assembly 10 shown, a glass disc 12 is positioned under the cuvettes 11 to describe the floor thereof, and a transparent top (not specifically shown) of the cuvette 11 allows a light beam 13 from a light source 14 to pass through the cuvette to a conventional photomultiplier detector 15.

In the rotor assembly 10, a removable sample transfer disc 16 contains a plurality of cavities 17a, 17b, and 17c for holding samples, reagents, and the like. The cavities 17a, 17b, and 17c communicate to the cuvette 11 through a transfer passage 18. In operation, a sample to be analyzed can be placed in one cavity 17b, a reagent can be placed in another cavity 17a, and when the rotor assembly 10 is rotated, by rotating power driving means 19 reagent flows into the cavity 17d containing the sample, mixes with the sample, and the mixture flows into a transfer cavity 17c, and then through the passage 18 into the cuvette 11. In a multi-station photometric analyzer such as an analyzer having 30 cuvettes and 30 sets of storage chambers communicating with the cuvettes, a reference liquid such as distilled water can be indexed for one cuvette, and the samples to be analyzed can be indexed for the others. The cuvette containing the reference liquid is then used as a standard against which each the remaining samples individually is measured.

Referring to FIG. 2, the output of photomultiplier detector 15 is applied at terminal 30 of the circuit arrangement illustrated. The signal applied at terminal 30 is a series of electrical pulses which includes a reference pulse.

Logarithmic amplifier 32, for example a Philbrick Model 4351, receives the electrical pulses applied at 30 and provides an output at 34 which is in the form of pulses. The electrical pulses developed at 34 are applied at input terminal 36 of difference amplified 38, which can be a Fairchild Model 741. The pulses developed at 34 are also applied at terminal 40 of field effect transistor 42. However transistor 40 is non-conducting except when a signal is applied at terminal 44. A signal, in the form of a timing pulse is applied at terminal 44 in coincidence with the reference pulse which appears at 34. Capacitor 46 is thus charged to the value of the reference pulse and this value is applied at input terminal 48 of difference amplifier 38 via buffer amplifier 47. The output of difference amplifier 38 is thus a series of pulses which are the difference between the reference pulse and all of the pulses which appear at 34. These pulses at the output 50 of difference amplifier 38 can be applied to a conventional oscilloscope or other device which will display pulses indicative of the light absorbence of the respective samples in the cuvettes.

What is claimed is:

1. A photometric analyzer for the substantially simultaneous determination of the light transmission of plurality of descrete samples, comprising:
   (a) a power-driven rotor assembly including:
      (1) a plurality of sample analysis chambers at a common radial position in said rotor assembly, each of said sample analysis chambers having at least one light-transmitting means for permitting the passage of light therethrough; and
      (2) at least one storage chamber communicating with each of said sample analysis chambers to retain liquid when said rotor assembly is at rest, and to release said liquid to said sample analysis chamber when said rotor assembly is rotated;
   (b) a light source for providing a beam of light incident on said rotor assembly at a location station on said common radial position whereby said beam of light passes through each of said sample analysis chambers individually as the sample analysis chambers pass said location station during rotation of said rotor assembly;
   (c) detecting means for measuring the intensity of said beam after it has passed through said sample analysis chambers individually, said detecting means including means for generating an electrical pulse each time one of said sample analysis chambers passes said location, each said electrical pulse being proportional to the measured intensity of said beam,
   (d) means for receiving each of said electrical pulses and for providing an output electrical pulse proportional to the logarithm of said received electrical pulses
   (e) a differential amplifier having two input terminals and an output terminal;
   (f) means for continuously applying a selected one of said output electrical pulses to one terminal of said differential amplifier and means for applying all of said output electrical pulses to the remaining terminal of said defferential amplifier whereby the output of said differential amplifier is a series of electrical pulses corresponding to the difference between the selected pulse and each of the other electrical pulses.

References Cited
UNITED STATES PATENTS 3,009,388   11/1961   Polangi _____ 356—196

RONALD L. WIBERT, Primary Examiner

O. B. CHEW II, Assistant Examiner

U.S. Cl. X.R.

250—218; 356—205